(12) United States Patent
Srinivasan et al.

(10) Patent No.: US 10,719,360 B2
(45) Date of Patent: Jul. 21, 2020

(54) DISTRIBUTED MULTIPLE TIER MULTI-NODE SERVERLESS FRAMEWORK FOR COMPLEX ANALYTICS TASK EXECUTION

(71) Applicant: Accenture Global Solutions Limited, Dublin (IE)

(72) Inventors: Madhan Kumar Srinivasan, Karnataka (IN); Arun Purushothaman, Chennai (IN); Vijaya Tapaswi Achanta, Telangana (IN)

(73) Assignee: Accenture Global Solutions Limited, Dublin (IE)

( * ) Notice: Subject to any disclaimer, the term of this patent is extended or adjusted under 35 U.S.C. 154(b) by 130 days.

(21) Appl. No.: 16/159,399

(22) Filed: Oct. 12, 2018

(65) Prior Publication Data
US 2019/0317808 A1 Oct. 17, 2019

(30) Foreign Application Priority Data
Apr. 11, 2018 (IN) .............................. 201841013880

(51) Int. Cl.
| | |
|---|---|
| *G06F 9/46* | (2006.01) |
| *G06F 9/48* | (2006.01) |
| *G06F 9/50* | (2006.01) |
| *H04L 29/08* | (2006.01) |
| *G06F 16/9535* | (2019.01) |
| *G06F 16/2457* | (2019.01) |

(52) U.S. Cl.
CPC .......... *G06F 9/4887* (2013.01); *G06F 9/5038* (2013.01); *G06F 9/5072* (2013.01); *G06F 16/24578* (2019.01); *G06F 16/9535* (2019.01); *H04L 67/10* (2013.01)

(58) Field of Classification Search
None
See application file for complete search history.

(56) References Cited

U.S. PATENT DOCUMENTS

| | | |
|---|---|---|
| 7,454,612 B2 | 11/2008 | Bolosky et al. |
| 9,442,954 B2 | 9/2016 | Guha et al. |

(Continued)

OTHER PUBLICATIONS

Hung, Pahm Phuoc, et al., "A Solution of Thin-Thick Client Collaboration for Data Distribution and Resource Allocation in Cloud Computing," International Conference on Information Networking (ICOIN), Jan. 30, 2013, pp. 238-243.

(Continued)

*Primary Examiner* — Bradley A Teets
(74) *Attorney, Agent, or Firm* — Brinks Gilson & Lione (57) ABSTRACT

A system may support distributed multiple tier multi-node serverless analytics task execution. At a data ingestion tier, data ingestion serverless tasks may receive detail data for analytic processing. data integration serverless tasks, executing at a data integration and consolidation tier and initiated by the data ingestion serverless tasks, may sort the detail data and identify patterns within the detail data to generate grouped pre-processed data. The data integration serverless tasks may initiate partitioning serverless tasks which may divide the grouped pre-processed data into data chunks. Multi-node analytic serverless tasks at an analytic tier, at least some of which being initiated by the partitioning serverless tasks, may analyze the data chunks and generate prescriptive outputs.

20 Claims, 4 Drawing Sheets

(56) References Cited

U.S. PATENT DOCUMENTS 9,703,594 B1 7/2017 Kamboj et al.
2013/0132967 A1 5/2013 Soundararajan et al.

OTHER PUBLICATIONS

Holste, Martin, "Building Scalable and Responsive Big Data Interfaces with AWS Lambda," Jul. 10, 2015, printed from the Internet at https://aws.amazon.com/blogs/big-data/building-scalable-and-responsive-big-data-interfaces-with-aws-lambda/, Jan. 18, 2018, 11 pgs.
"Can you split AWS Lambda Functions?" May 2016, printed from the Internet at https://www.quora.com/Can-you-split-AWS-Lambda-Functions, Jan. 18, 2018, 2 pgs.
Manoochehri, Michael, MapReduce and Data Transformation, *Data Just Right: Introduction to Large-Scale Data & Analytics*, Addison-Wesley, Nov. 30, 2013, p. 101.
Wagner, Tim, "Using Amazon SNS to Trigger Lambda Functions," Apr. 15, 2015, printed from the Internet at https://aws.amazon.com/blogs/compute/using-amazon-sns-to-trigger-lambda—functions, Jan. 18, 2018, 2 pgs.
Extended European Search Report in Europe Application No. 19161151.6, dated Aug. 8, 2019, 13 pages.
Examination report No. 1 for corresponding Australian patent application No. 2019201544, dated Dec. 19, 2019, 3 pages.

DISTRIBUTED MULTIPLE TIER MULTI-NODE SERVERLESS FRAMEWORK FOR COMPLEX ANALYTICS TASK EXECUTION

PRIORITY CLAIM

This application claims priority to, and incorporates by reference in its entirety, Indian Patent Application No. 201841013880, filed Apr. 11, 2018, entitled Distributed Multiple Tier Multi-Node Serverless Framework for Complex Analytics Task Execution.

TECHNICAL FIELD

This disclosure relates to a distributed multiple tier multi-node serverless framework for complex analytics task execution.

BACKGROUND

Rapid advances in communications and storage technologies, driven by immense customer demand, have resulted in widespread adoption of cloud systems for managing large data payloads, distributed computing, and record systems. As one example, modern enterprise systems presently maintain data records many petabytes in size in the cloud. Improvements in tools for execution of analytics systems will further enhance the capabilities of cloud computing systems.

DETAILED DESCRIPTION

Serverless cloud systems may allow operators to run a routine, execute an application, or perform other types of computational tasks (e.g., serverless tasks) without necessarily requiring the operator to first define a virtual system or requisition specific hardware on which to perform the computational task. Accordingly, an operator may request the performance of a serverless task without designating any particular hardware or virtualized hardware on which the serverless task should run. In serverless cloud computing environments, computing providers may enforce execution limits, such as task timeouts, maximum processing loads, processor cycles, or other limits on compute resource consumption. In some cases, the execution limits may be enforced per serverless task. Accordingly, the provider may force a serverless task to terminate within the execution limit. In an illustrative example, an example provider may enforce a five-minute task timeout for serverless tasks implemented using the provider's cloud platforms. Accordingly, tasks may not necessarily execute for longer than five minutes from start to termination.

In some cases, a particular computing project of one or more applications received for execution as a single project in a serverless cloud system may call for computing resources in excess of a defined execution limit. The particular computing project may be received as a unified single project, and automatically and dynamically divided or partitioned prior to commencement by a multiple tier serverless execution structure (MTSES) system. The tasks within the computing project being performed with the application may be completed after the system dynamically and automatically divides or parses the received single computing project across multiple serverless tasks. In some cases, the system may dynamically form, generate and/or allocate the serverless task to be partially or fully concurrent such that data may be passed between the serverless tasks to achieve computational continuity that persists beyond the executions limits, to achieve coordinated parallel computing among the tasks, or achieve some combination thereof.

To divide the computing project, the MTSES system may dynamically determine one or more partitioning criteria to guide division of the computing project. For example, the partitioning criteria may be used to partition a dataset with detail data (or pre-processed data) such that multiple serverless tasks each perform an analytic analysis on a portion of the dataset. Accordingly, the computing project as a whole may be performed by the system dynamically developing and coordinating multiple serverless task each acting on a portion of the input data to the system.

The system may dynamically determine one or more concurrency criteria based on factors, such as, the resource consumption of the computing project or its parts, the target completion date (e.g., a date, time of day, specific time), the computing resources allocated to the serverless tasks, the execution limits, a persistence target length or other factors affecting computation completion and the number of serverless tasks requested. For example, the system may increase duration of concurrent overlap of serverless tasks to shorten the overall completion time of a computing project. In another example, the system may decrease the duration of concurrent overlap to extend the period over which computational continuity is maintained, e.g., across multiple partially overlapping serverless tasks.

The determination and use of partitioning criteria and/or concurrency criteria in the partitioning of a computing project provide a technical solution to the technical problem of maintaining computational continuity across execution-limited serverless tasks, e.g., within the technical context of cloud computing. Further, the continuity provided through determination and use of partitioning criteria and/or concurrency criteria in the partitioning of a computing project facilitates synchronization, (e.g., timing and/or data synchronization) to serverless computing processes thereby increasing the efficiency and accuracy of the underlying hardware executing the serverless tasks. Further, the determination and use of partitioning criteria and/or concurrency criteria in the partitioning of a computing project allows completion of complex computing projects on execution-limited serverless tasks, rather than calling for persistent (e.g., server model) virtual machines and/or other computing resources. Thus, the determination and use of partitioning criteria and/or concurrency criteria in the partitioning of a computing project provides improvements over existing market solutions.

In some implementations, a computing project may call for compute logistics (e.g., ordering of particular tasks, hierarchical operation, or other complex compute logistical operations). Accordingly, partitioning tasks for execution in a linear operation may not necessarily account for the complete complexity of a particular computing project. In some cases, compute logistics may be facilitated by structuring the serverless tasks into multiple tiers. For example, a particular computing project include internal execution where a first serverless task initiates a second serverless task after the first serverless task (or another serverless task at the same tier as the first serverless task) generates data to be used by the second serverless task during execution. In another illustrative example, a first serverless task may determine partitioning criteria and/or concurrency criteria for partitioning a dataset in advance of processing at a tier different from the first serverless task. Accordingly, the multiple-tier system may execute computing projects with complex compute logistics, including for example, setting up multiple concurrent serverless tasking through execution of a first serverless task at another tier, readying data at a first tier for processing at a second tier, data ingestion at a first tier for processing at a second, partitioning data at first tier for processing at a second, other complex compute logistics, or a combination thereof.

In a multiple-association input data scenario, such as the inclusion of data for multiple different clients, the multiple tiers of serverless tasks may partition one or more of the client data sets into chunks. The chunks may be distributed across a unified set of serverless tasks for multiple-different associations. Accordingly, association based differentiation of data may not necessarily drive processing divisions within the serverless tasks. Thus, structuring the serverless tasks into multiple tiers (e.g., by facilitating complex compute logistics) improves the computational capacity, efficiency, and accuracy of the underlying hardware. Further, by, for example, expanding the array of computational processes that may be achieved in the context of a serverless environment, structuring the serverless tasks into multiple tiers provides an improvement over existing market solutions.

Figure 1:
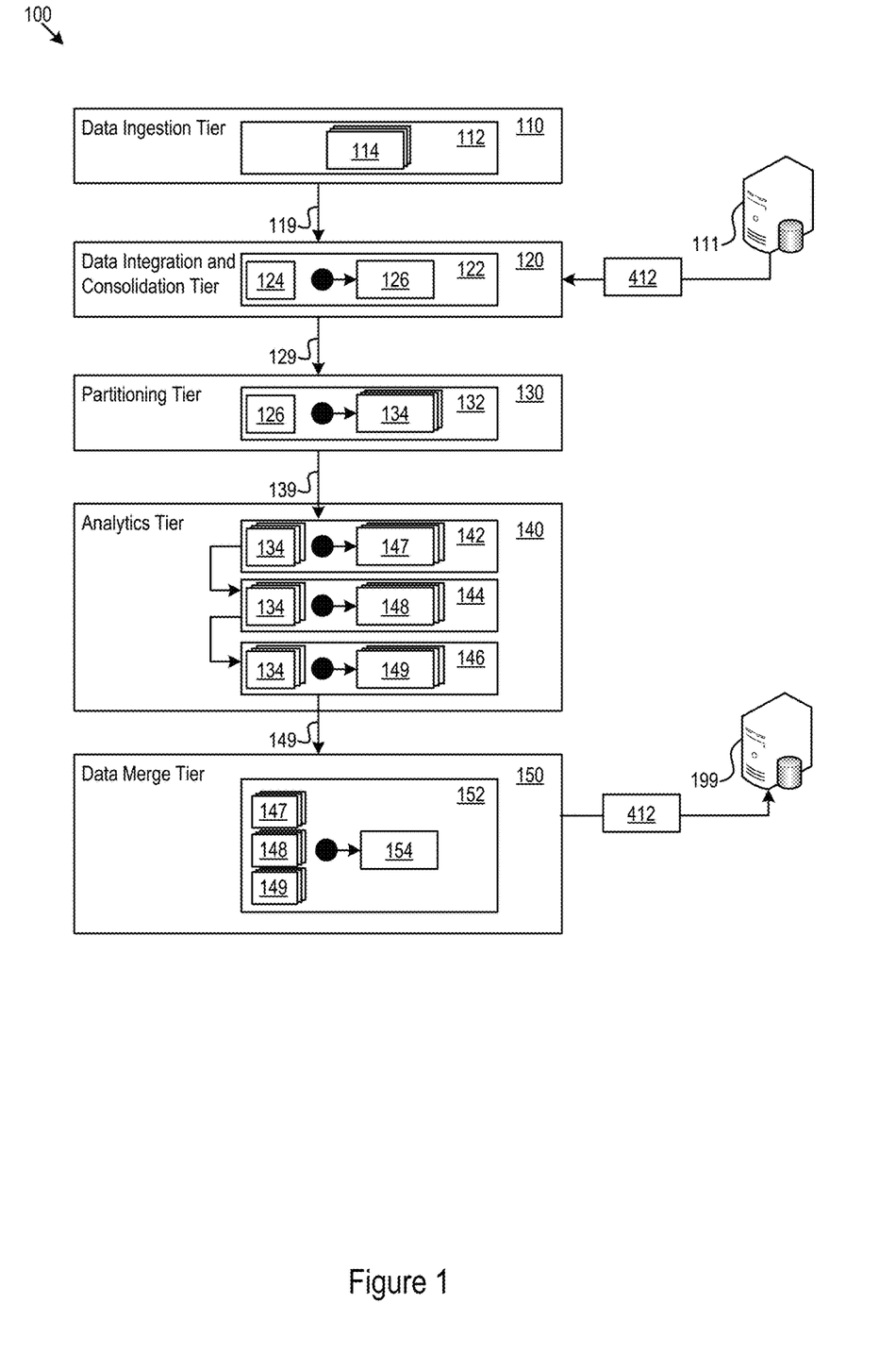
FIG. 1 shows an example multiple tier serverless execution structure.

Referring now to FIG. 1, an example multiple tier serverless execution structure system (MTSES) 100 is shown. The multiple tiers of the MTSES 100 may execute on processing circuitry making up the hardware underpinning of the MTSES 100. In this example, the MTSES 100 includes a data ingestion tier 110, a data integration and consolidation tier 120, a partitioning tier 130, an analytics tier 140, and a data merge tier 150.

In various illustrative scenarios, the MTSES 100 may be used as a platform for computing analytics. Accordingly, the MTSES 100, using serverless processes executing at the data ingestion tier, may obtain input data from various sources.

In an example scenario, the MTSES 100 may analyze historical utilization data, tagging data and consumption metric data to predict future utilization and produce prescriptive analytic recommendations in the context of cloud computing. Utilization data, may include, for example, historical data related to usage or activation of cloud computing resources, e.g., resource allocation history, activation/reservation/committed-use history data, expenditure report data for resource reservation/activation/committed-use, processor activity, memory usage history, computing cycles, data throughput, or other utilization metrics, seasonal usage cycles e.g., holiday schedules, daily usage cycles, weekly usage cycles, quarterly usage cycles or other data. Tagging data may include computing resource specific data. For example, tagging data may include data provided by an operator, provisioning or configuration management system, or an analyzed system detailing functional groupings (e.g., project-specific allocations, hardware (including virtualized hardware) marked for a specific purpose, availability zones, operating systems applications, installed software, or other groupings), quality of service requirements, minimum allocations, environmental data, license tags, or other tagging data. Consumption metric data may include computing resource specific cost metrics such as expenditure-per-time or resource-per-time metrics.

In another example scenario, the MTSES 100 may analyze utility sensor data for generation of complex predictive and/or prescriptive recommendations in the context of utility plant (power generation, smart grid, metered-area water provision, natural gas provision, and/or other utilities).

In yet another example scenario, the MTSES 100 may analyze internet of things (IoT) data for generation of complex predictive and/or prescriptive recommendations in various contexts, such as consumer demand prediction, power usage, fitness tracking for actuary tables, or other analytic contexts.

Figure 2:
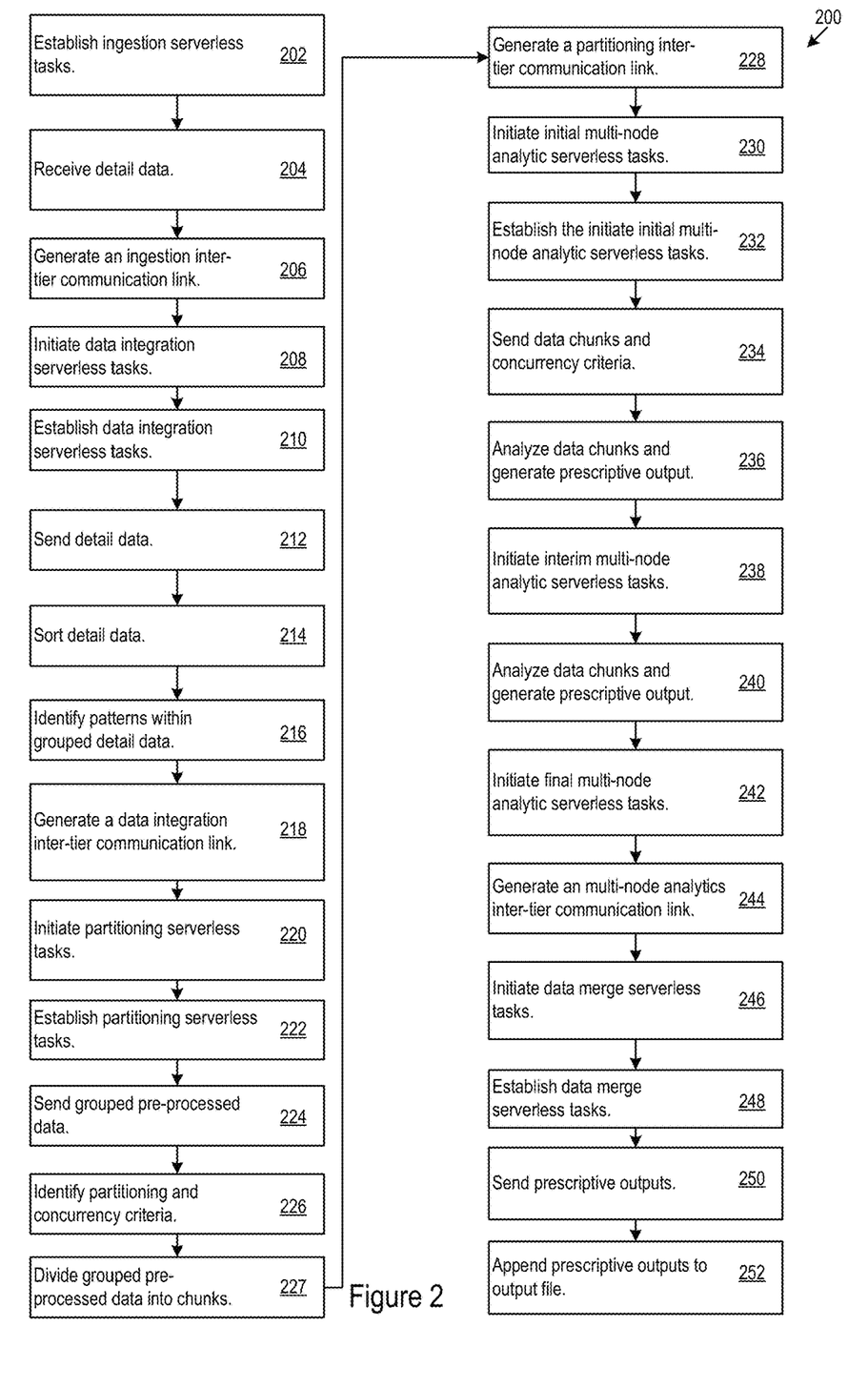
FIG. 2 shows example multiple tier serverless processing logic.

In the following, reference is made to the MTSES 100 of FIG. 1 and the corresponding example multiple-tier serverless logic (MTSL) 200 in FIG. 2 in the context of the MTSES system. The logical features of the MTSL 200 may be implemented in various orders and combinations. For example, in a first implementation, one or more features may be omitted or reordered with respect to a second implementation.

At the data ingestion tier 110, the MTSL 200 may establish one or more data ingestion serverless tasks 112 (202). In various implementations, via the data ingestion serverless tasks, the MTSES 100 may receive one or more sets (e.g., sets 1, 2, . . . , n) of detail data 114 (e.g., historical utilization data, tagging data, consumption metric data, utility sensor data, IoT data, retail/consumer data, gaming data, or other analytic data) through network interface circuitry (e.g., communication interfaces 412, see below) from one or more data sources 111, which may be different from one another (204). In various implementations, the data ingestion serverless tasks 112 may include detail data 114 with in a defined analysis window. For example, data outside the analysis window may be excluded from the detail data 114. In an example scenario, a defined analysis window may include a 90-day period. In the example scenario, the data ingestion serverless tasks 112 may exclude, from the detail data, data originating outside the 90-day period.

Once the detail data is received, the data ingestion serverless tasks may generate an ingestion inter-tier communication link (206). Inter-tier communication links may allow serverless tasks in first tier pass data to serverless tasks structured into another tier. For example, inter-tier communication links may utilize network hardware resources to communicate with serverless tasks running across distributed system. Additionally or alternatively, inter-tier communication links may use data transfers over internal system buses. In some cases, the inter-tier communication links may include memory addresses (registers, pointers, or other memory addresses) where communication from one serverless task to another serverless task may be stored and accessed to effect communication between the tasks. In some cases, publish and subscribe (pub/sub) messaging may be used to communicate between the layers. In an illustrative example, an inter-tier communication link may use a simple-notification-service (SNS) pub/sub system.

Using the ingestion, the inter-tier communication link 119, the data ingestion serverless tasks 112 may initiate one or more data integration serverless tasks at the data integration and consolidation tier (208). Initiation of serverless tasks may include sending a message indicating that the task should be executed. In some cases, the initiation may further include sending a task descriptor (e.g., a token or other data structure) that details the operation, dependencies, or other data used to setup the new serverless task. Accordingly, a first serverless task may spawn a second serverless task without necessarily depending input from a third source. In other words, initiation may include actions ranging from sending a notification to start a new serverless to fully detailing and establishing the new serverless task, and/or other actions.

Responsive to initiation by the data ingestion serverless tasks 112, the MTSL 200 may establish the one or more data integration serverless tasks 122 (210). Over the ingestion inter-tier communication link 119, the MTSL 200 may receive the initiation messages and/or task descriptors from the data ingestion serverless tasks 112. The MTSL 200 may setup the one or more data integration serverless tasks 122 based on the received data. In some cases, the MTSL 200 may operate through the data ingestion serverless tasks 112 to effect setup of the one or more data integration serverless tasks 122.

Once the one or more data integration serverless tasks 122 are initiated, the data ingestion serverless tasks 112 may send the detail data 114 to the data integration serverless tasks 122 (212). To send data, the transmitting serverless tasks may stream the data to the target serverless tasks, store the data at a defined local or network memory address, publish the data in a pub/sub communication scheme, and/or otherwise transfer the data in accord with the nature of the inter-tier communication link.

The data integration serverless tasks 122 may sort the detail data into one or more association groupings (214) to generated grouped detail data 124. Association groupings may include various data categories. For example, the MTSL 200 may maintain an association group for each of multiple clients with separate analytic processing requests. In an example, the MTSL 200 may maintain association groupings for grouping data based on the sensor from which the data was received. In some cases, an association grouping may cover multiple related sensors or multiple sensors of the same sensor type (e.g., a group for water pressure sensors, another group for flow sensors, yet another group for foaming sensors, or other sensor type groupings. Other example association groupings may include geographic groupings (e.g., grouping by physical location of data source or target of data relevance), grouping according to tagging (e.g., operator or system defined tags may be used for grouping), and grouping according to a utility association (e.g., grouping data related to assets managed by a utility).

The data integration serverless tasks 122 may parse the grouped detail data to identify patterns present within the grouped detail data to generate grouped pre-processed data 126 (216). The patterns may include, for example, temporal patterns, time-invariant patterns, sensor relationships (e.g., correlations, anti-correlations, other relationships), rule-related patterns (e.g., business rules, data handling rules), or other patterns.

As an illustrative example, the data integration serverless tasks 122 may identify temporal patterns within the grouped detail data. For example, the data integration serverless tasks 122 may determine one or more timescales (e.g., timescales including time-invariant contributions) present within the data. For example, the data integration serverless tasks 122 may apply various frequency analyses to the data to determine periodic, aperiodic, and/or time-invariant trends.

In various implementations, the data integration serverless tasks 122 may also clean the grouped detail data to remove outlier data or other data that may interfere with an analytic analysis. In some cases, data cleaning schemes may be defined for the particular analysis performed at the analytic tier 140.

The data integration serverless tasks 122 may generate a data integration inter-tier communication link 129 (218), initiate one or more partitioning serverless tasks 132 (220), and, after establishment of the partitioning serverless tasks 132, send the grouped pre-processed data 126 to the partitioning serverless tasks 132 (224). Responsive to initiation by the data integration serverless tasks 112, the MTSL 200 may establish the one or more partitioning serverless tasks 132 (222) at the partitioning tier 130.

The partitioning serverless tasks 132 may identify partitioning and concurrency criteria for the grouped pre-processed data 126 (226). The partitioning criteria may detail the size of the chunks that the grouped pre-processed data 126 is divided into. The concurrency criteria may detail the temporal overlap between multi-node analytic serverless tasks. In various implementations, concurrency between serverless tasks may range from fully parallel (e.g., 100% temporal overlap) to fully serial (e.g., 0% temporal overlap). In some implementations, various groups of serverless tasks may be implemented fully in parallel, while being partially concurrent with other serverless tasks.

Figure 3:
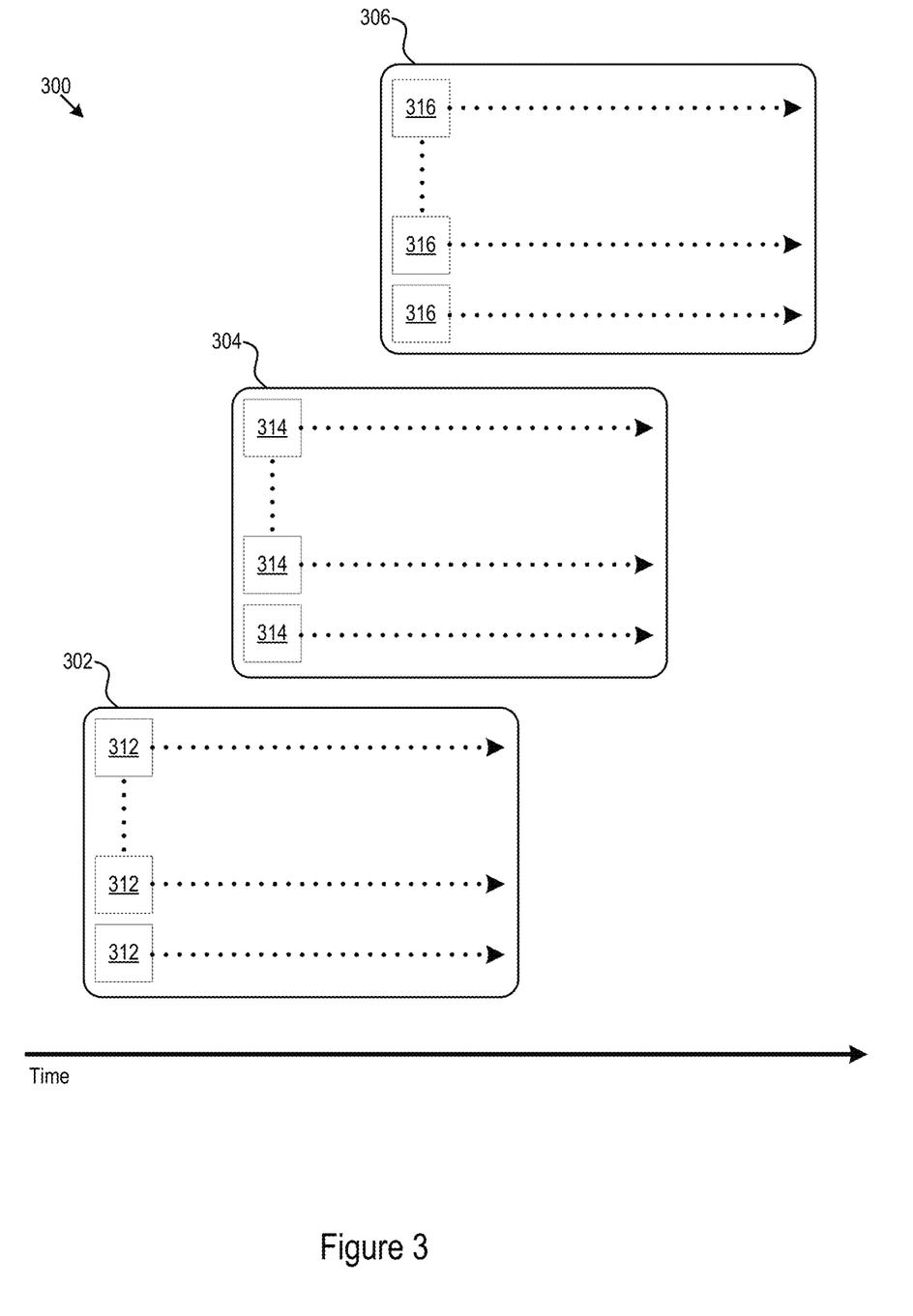
FIG. 3 shows an example concurrent serverless task schedule.

FIG. 3 shows an example concurrent serverless task schedule 300. In the example task schedule 300, the serverless tasks 312, 314, 316 are executed in multiple groups 302, 304, 306 of parallel serverless tasks. In the first group 302, the MTSL 200 executes parallel serverless tasks 312 1 to N. In the second group 304, the MTSL 200 executes serverless tasks 314 N+1 to M. In the third group 306, the MTSL 200 executes serverless tasks 316 M+1 to P for a total of P serverless tasks. In various implementations, the MTSL 200 may use other concurrency groupings.

In some cases, the partitioning serverless tasks 132 may aim to divide the grouped pre-processed data 126 into chunks that a serverless task can analyze within any defined execution limits. Additionally or alternatively, the partitioning serverless tasks 132 may aim maintain continuity throughout the analyzation at the analytics tier by, for example, ensuring that each analytics serverless task overlaps temporally with at least one other analytics serverless task. Accordingly, both the partitioning and concurrency criteria may be based on the execution limit.

In some cases, the partitioning serverless tasks 132 may aim to divide the grouped pre-processed data 126 into chunks to ensure that the analyzation of the grouped pre-processed data 126 occurs in accord with a particular schedule. Additionally or alternatively, the partitioning serverless tasks 132 may aim to increase or decrease the parallelization of the multi-node analytic serverless tasks to meet the particular schedule. Accordingly, both the partitioning and concurrency criteria may be based on the size (e.g., file size in bytes, number of data entries, or other size metric) of the grouped pre-processed data 126, because the size may determine (at least in part) the number of chunks needed to meet the schedule and the number of chunks may determine the parallelization needed to meet the schedule. In some cases, the partitioning serverless tasks may also determine the number of tasks based on a computational capacity of an individual task within the system.

In some cases without a particular schedule, the size of the grouped pre-processed data 126 may affect the number of chunks that the grouped pre-processed data 126 is split into. For example, the execution limit and grouped pre-processed data 126 size may establish a minimum number of chunks needed to analyze the grouped pre-processed data 126 while conforming to the execution limit.

In some cases, the computational capacity of an individual serverless task may also influence the partitioning and concurrency criteria. However, in some implementations, the computational capacity of an individual serverless task may be specifically defined by the execution limit.

After identifying the partitioning criteria, the partitioning serverless tasks 132, may divide the grouped pre-processed data 126 into multiple chunks 134 (227) (e.g., chunks 1, 2, . . . , m). The sizes of the chunks 134 may be determined based on the partitioning criteria.

Referring again to FIGS. 1 and 2, the partitioning serverless tasks 132 may generate a partitioning inter-tier communication link 139 (228), initiate one or more initial multi-node analytic serverless tasks 142 (230), and, after establishment of the initial multi-node analytic serverless tasks 142, send one or more of the data chunks 134 and the concurrency criteria to the initial analytics serverless tasks 142 (234). Responsive to initiation by the partitioning serverless tasks 132, the MTSL 200 may establish the one or more initial multi-node analytic serverless tasks 142 (232) at the analytic tier 140.

The initial multi-node analytic serverless tasks 142 may analyze the data chunks in accord with their respective analytic engines and generate a prescriptive output(s) 147 (236). As discussed above, various analytic systems may be executed using the techniques and architectures discussed herein as a serverless execution platform. The prescriptive output 147 may include one or more insights determined based on the analytics. Further, the prescriptive outputs 147 may include scripts or other code for implementing the insights.

In an illustrative example for an analytics system for generating prescriptive recommendations for requisition in cloud computing applications, the prescriptive output 147, 148, 149 may include commands, scripts, or other code to cause host interfaces for controlling the cloud computing resources. For example, services such as Amazon® Web Services (AWS), Google® Compute Engine, Microsoft® Azure, or other cloud computing services, may maintain host interfaces (e.g., web interfaces, application programming interfaces, or other interfaces) by which clients may define operation of the computing resources.

In accord with the concurrency criteria, at least one of the initial multi-node analytic serverless tasks 142 may initiate one or more interim multi-node analytic serverless tasks 144 (238). The interim multi-node analytic serverless tasks 144 may access chunks 134 and generate prescriptive outputs 148 (240). The interim multi-node analytic serverless tasks 144 may access the chunks through receipt from the initial multi-node analytic serverless tasks 142 or via the partitioning inter-tier communication link 139 from the partitioning serverless tasks 132. For example, the partitioning serverless tasks 132 may place the chunks 134 in storage otherwise effect the partitioning inter-tier communication link 139 that persists after the partitioning serverless tasks 132 have terminated. In another example, the partitioning serverless tasks may persist after the interim multi-node analytic serverless tasks 144 are established by the MTSL 200.

The interim multi-node analytic serverless tasks 144 may initiate more interim serverless tasks or final multi-node analytic serverless tasks 146 (242). The final multi-node analytic serverless tasks 146 may also generate prescriptive outputs 148.

In various implementations, the MTSES 100 may apply a one-to-one correspondence between individual multi-node analytic serverless tasks 142, 144, 146, data chunks 134, and prescriptive outputs 147, 148, 149.

In various implementations, the final multi-node analytic serverless tasks 146 may be initiated by the initial multi-node analytic serverless tasks 142. For example, the interim multi-node analytic serverless tasks 144 and the final multi-node analytic serverless tasks 146 may be the same serverless tasks. Additionally or alternatively, the initial multi-node analytic serverless task may be partially concurrent with the final multi-node analytic serverless tasks (even in some cases where interim multi-node analytic serverless tasks are established by the MTSL 200 before the final multi-node analytic serverless tasks are similarly established). In some implementations, the initial and final multi-node analytic serverless tasks may be the same serverless tasks.

The final multi-node analytic serverless tasks 146 may generate an analytics inter-tier communication link 149 (244), initiate one or more data merge serverless tasks 152 (246), and, after establishment of the data merge serverless tasks 152, send one or more of the prescriptive outputs to the data merge serverless tasks 152 (250). Responsive to initiation by the final multi-node analytic serverless tasks 146, the MTSL 200 may establish the one or more data merge serverless tasks 152 (248) at the data merge tier 150.

The multi-node analytic serverless tasks are described as initial, interim, and final. In various implementations, these designations may indicate an order in which tasks are executed under the concurrency criterion. In some cases, the designations may not necessarily designate a logical division. In some cases, the initial, interim, and final may include the same logical structure but may operate on different data (e.g., different data chunks).

The data merge serverless tasks 152 may append the prescriptive outputs to an output file 154 for the association group defined at the data integration and consolidation tier 120 for the grouped pre-processed data 126 (252). In some cases, the data merge serverless tasks 152 may maintain separate output files 154 for each of the association groupings defined at the data integration and consolidation tier 120.

In some implementations, the data merge serverless tasks 152 may store the appended prescriptive outputs in at a storage host server 199 (e.g., a database, such as, a MySQL database or other database; a data lake; or other storage system). The stored prescriptive outputs may be accessed for review and presentation.

In various implementations, the data ingestion, data integration, partitioning, and/or data merge serverless tasks may include a series of serverless tasks. In some cases, each task within any or each of the series may be at least partially concurrent with another task within the series. Further, within any or each of the series, a previous serverless task may initiate another serverless task within the same tier. In some cases, implementing the data ingestion, data integration, partitioning, and/or data merge serverless tasks as a partially concurrent series may allow computational continuity to persist within a tier beyond execution limits.

Figure 4:
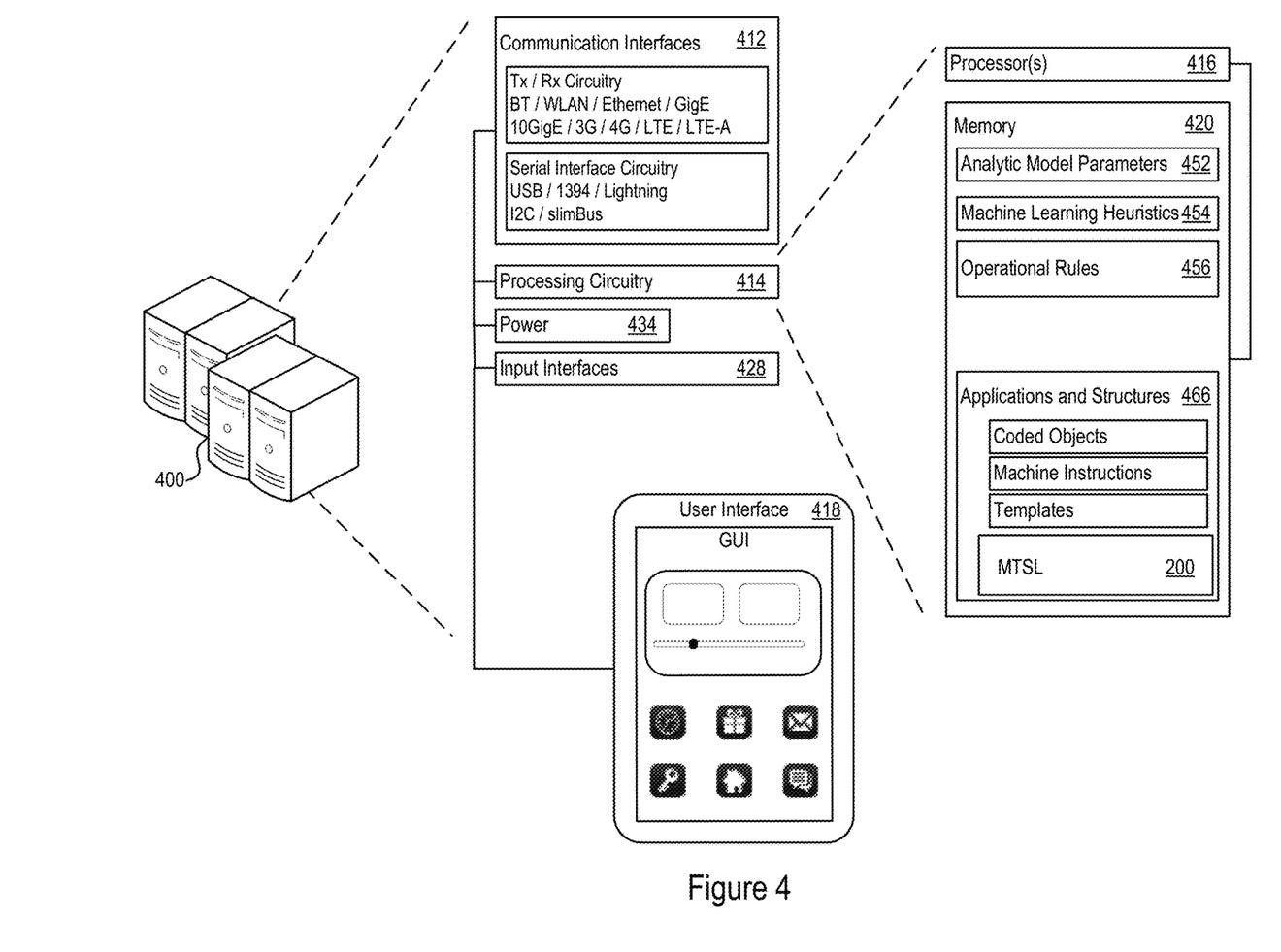
FIG. 4 shows an example specific execution environment for the serverless execution structure of FIG. 1.

FIG. 4 shows an example execution environment 400 for the MTSES 100 described above. The execution environment 400 may include processing circuitry 414 to support execution of the multiple tiers of MTSES 100 described above. The processing circuitry 414 may include processors 416, memory 420, and/or other circuitry. In various implementations, the execution environment may include a serverless execution environment. Accordingly, the process circuitry may include the underlying circuitry used to execute the serverless tasks. In some cases, the circuitry used to perform one or more of the serverless tasks may be the distributed. The instructions stored on the processing circuitry (whether localized or distributed) transforms the processing circuitry into a specifically configured machine in accord with some or all of the architectures and techniques discussed in this disclosure. In some distributed cases, the specific portion of the distributed hardware that may be executing the serverless tasks may change as execution progresses.

The memory 420 may include analytic model parameters 452, machine learning heuristics 454, and operational rules 456. The memory 420 may further include applications and structures 466, for example, coded objects, machine instructions, templates, or other structures to support grouped pre-processed data 126 generation or other tasks described above. The applications and structures may implement the MTSL 200.

The execution environment 400 may also include communication interfaces 412, which may support wireless, e.g. Bluetooth, Wi-Fi, WLAN, cellular (4G, LTE/A), and/or wired, Ethernet, Gigabit Ethernet, optical networking protocols. The communication interfaces 412 may also include serial interfaces, such as universal serial bus (USB), serial ATA, IEEE 1394, lighting port, I$^2$C, slimBus, or other serial interfaces. The communication interfaces 412 may be used to support and/or implement remote operation of the MTSES 100. The execution environment 400 may include power functions 434 and various input interfaces 428. The execution environment may also include a user interface 418 that may include human-to-machine interface devices and/or graphical user interfaces (GUI). The user interface 418 may be used to support and/or implement local operation of the MTSES 100. As discussed above, in various implementations, the processing circuitry 414 may be distributed over one or more physical servers, be implemented as one or more virtual machines, be implemented in container environments such as Cloud Foundry or Docker, and/or be implemented in serverless (functions as-a-service) environments.

In some cases, the execution environment 400 may be a specially-defined computational system deployed in a cloud platform. In some cases, the parameters defining the execution environment may be specified in a manifest for cloud deployment. The manifest may be used by an operator to requisition cloud based hardware resources, and then deploy the software components, for example, the MTSES 100, of the execution environment onto the hardware resources. In some cases, a manifest may be stored as a preference file such as a YAML (yet another mark-up language), JSON, or other preference file type.

The methods, devices, processing, circuitry, and logic described above and below may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in tangible storage media that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on other machine-readable media. The media may be made-up of a single (e.g., unitary) storage device, multiple storage devices, a distributed storage device, or other storage configuration. A product, such as a computer program product, may include storage media and instructions stored in or on the media, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations may use the techniques and architectures described above.

A1 In an example, a system includes: network interface circuitry configured to: receive ingestion detail data from multiple data sources; and sending first and second prescriptive outputs to a storage host server; and tiered analytic processing circuitry configured to execute multiple tiers of serverless tasks, the multiple tiers including: a data ingestion tier; a data integration and consolidation tier; a partitioning tier; and an analytic tier; the tiered analytic processing circuitry configured to: establish, at the data ingestion tier, a data ingestion serverless task configured to: access, via the network interface circuitry, the ingestion detail data; and generate an ingestion inter-tier communication link; and via the ingestion inter-tier communication link: initiate a data integration serverless task; responsive to initiation from the data ingestion serverless task, establish, at the data integration and consolidation tier, the data integration serverless task, the data integration serverless task configured to: sort the ingestion detail data into an association grouping to generate grouped detail data; parse the grouped detail data to identify patterns present within the grouped detail data to generate grouped pre-processed data; generate a data integration inter-tier communication link; and via the data integration inter-tier communication link: initiate a partitioning serverless task; responsive to initiation from the data integration serverless task, establish, at the partitioning tier, the partitioning serverless task, the partitioning serverless task configured to: identify a partitioning criterion and a concurrency criterion based on a serverless task execution limit and a size of the grouped pre-processed data; partition the grouped pre-processed data in accord with the partitioning criterion to generate a first data chunk and a second data chunk; generate a partitioning inter-tier communication link; and via the partitioning inter-tier communication link: initiate a first multi-node analytic serverless task; responsive to initiation from the partitioning serverless task, establish, at the analytic tier, the first multi-node analytic serverless task configured to: analyze the first data chunk and at least a first portion the patterns present within the grouped detail data to generate the first prescriptive output; and initiate a second multi-node analytic serverless task, the period based on the concurrency criterion; and responsive to initiation from the first multi-node analytic serverless task, establish, at the analytic tier, the second multi-node analytic serverless task, the second multi-node analytic serverless task configured to analyze the second data chunk and at least a second portion the patterns present within the grouped detail data to generate the second prescriptive output.

A2 The system of example A1, where: the multiple tiers further include a data merge tier; and the tiered analytic processing circuitry is further configured to: establish, in accord with the concurrency criterion, a final multi-node analytic serverless task configured to: generate an analytic inter-tier communication link; and via the analytic inter-tier communication link, initiate a data merge serverless task; and responsive to initiation from the final multi-node analytic serverless task, establish, at the data merge tier, a data merge serverless task configured to merge the first and second prescriptive outputs.

A3 The system of either of examples A1 or A2, where the second multi-node analytic serverless task is the final multi-node analytic serverless task.

A4 The system of any of examples A1-A3, where the data integration serverless task is configured to sort the ingestion detail data into multiple association groupings based on multiple predetermined associations.

A5 The system of example A4, where the storage host server is configured to control multiple databases each defined for a respective one of the multiple association groupings.

A6 The system of either of examples A4 or A5, where the multiple association groupings include one or more from among: a client association, a sensor type association, a geographic association, a tagging association, and a utility association.

A7 The system of any of examples A1-A6, where the data integration serverless task is further configured to: prior to sorting the ingestion detail data, exclude ingestion detail data outside of a defined analysis window.

A8 The system of any of examples A1-A7, where the serverless task execution limit includes a pre-defined serverless task timeout.

A9 The system of any of examples A1-A8, where the size of the grouped pre-processed data includes a number of entries within the grouped pre-processed data.

A10 The system of any of examples A1-A9, where one or more from among: the data ingestion serverless task, the data integration serverless task, and the partitioning serverless task include a series of serverless tasks.

A11 The system of example A10, where each serverless task within the series is partially concurrent with another one of the serverless tasks in the series.

A12 The system of any of examples A1-A11, where the partitioning serverless task is configured to determine the partitioning criterion and the concurrency criterion further based on a target processing completion schedule for the analytics tier.

A13 The system of example A12, where the partitioning serverless task is configured to determine the partitioning criterion and the concurrency criterion further based on the target processing completion schedule for the analytics tier by determining a number of multi-node analytic serverless tasks with a capacity to finish processing the grouped pre-processed data prior to a completion target time.

A14 The system of any of examples A1-A13, where the data ingestion serverless task is configured to pass the ingestion detail data to the data integration serverless task by providing the data integration serverless task with a storage location for the ingestion detail data.

B1 In an example, a method includes: at network interface circuitry: receiving ingestion detail data from multiple data; and sending first and second prescriptive outputs to a storage host server; and at tiered analytic processing circuitry configured to execute multiple tiers of serverless tasks: establishing, at a data ingestion tier of the multiple tiers, a data ingestion serverless task configured to: accessing, via execution of the data ingestion serverless task, the ingestion detail data; generating, via execution of the data ingestion serverless task, an ingestion inter-tier communication link; via the ingestion inter-tier communication link: initiating, via execution of the data ingestion serverless task, a data integration serverless task; responsive to initiation from the data ingestion serverless task, establishing, at a data integration and consolidation tier of the multiple tiers, the data integration serverless task; sorting, via execution of the data integration serverless task, the ingestion detail data into an association grouping to generate grouped detail data; parsing, via execution of the data integration serverless task, the grouped detail data to identify patterns present within the grouped detail data to generate grouped pre-processed data; generating, via execution of the data integration serverless task, a data integration inter-tier communication link; via the data integration inter-tier communication link: initiating, via execution of the data integration serverless task, a partitioning serverless task; and responsive to initiation from the data integration serverless task, establishing, at a partitioning tier of the multiple tiers, the partitioning serverless task; identifying, via execution of the partitioning serverless task, a partitioning criterion and a concurrency criterion based on a serverless task execution limit and a size of the grouped pre-processed data; partitioning, via execution of the partitioning serverless task, the grouped pre-processed data in accord with the partitioning criterion to generate a first data chunk and a second data chunk; generating, via execution of the partitioning serverless task, a partitioning inter-tier communication link; via the partitioning inter-tier communication link: initiating, via execution of the partitioning serverless task, a first multi-node analytic serverless task; and responsive to initiation from the partitioning serverless task, establishing, at an analytic tier of the multiple tiers, the first multi-node analytic serverless task; analyzing, via execution of the first multi-node analytic serverless task, the first data chunk and at least a first portion the patterns present within the grouped detail data to generate the first prescriptive output; initiating a second multi-node analytic serverless task, the period based on the concurrency criterion; responsive to initiation from the first multi-node analytic serverless task, establishing, at the analytic tier, the second multi-node analytic serverless task; and analyzing, via execution of the second multi-node analytic serverless task, the second data chunk and at least a second portion the patterns present within the grouped detail data to generate the second prescriptive output.

B2 The method of example B1, further including at the tiered analytic processing circuitry: establishing, in accord with the concurrency criterion, a final multi-node analytic serverless task; generating, via execution of the final multi-node analytic serverless task, an analytic inter-tier communication link; via the analytic inter-tier communication link and via execution of the final multi-node analytic serverless task, initiating a data merge serverless task; responsive to initiation from the final multi-node analytic serverless task, establishing, at a data merge tier of the multiple tiers, a data merge serverless task; and merging, via execution of the data merge serverless task, the first and second prescriptive outputs.

B3 The method of either of examples B1 or B2, where one or more from among: the data ingestion serverless task, the data integration serverless task, and the partitioning serverless task include a series of serverless tasks.

C1 In an example, a product includes: machine-readable media other than a transitory signal; and instructions stored on the machine-readable media, the instructions configured to, when executed, cause a machine to: at network interface circuitry: receive ingestion detail data from multiple data; and send first and second prescriptive outputs to a storage host server; and at tiered analytic processing circuitry configured to execute multiple tiers of serverless tasks: establish, at a data ingestion tier of the multiple tiers, a data ingestion serverless task configured to: access, via execution of the data ingestion serverless task, the ingestion detail data; generate, via execution of the data ingestion serverless task, an ingestion inter-tier communication link; via the ingestion inter-tier communication link: initiate, via execution of the data ingestion serverless task, a data integration serverless task; responsive to initiation from the data ingestion serverless task, establish, at a data integration and consolidation tier of the multiple tiers, the data integration serverless task; sort, via execution of the data integration serverless task, the ingestion detail data into an association grouping to generate grouped detail data; parse, via execution of the data integration serverless task, the grouped detail data to identify patterns present within the grouped detail data to generate grouped pre-processed data; generate, via execution of the data integration serverless task, a data integration inter-tier communication link; via the data integration inter-tier communication link: initiate, via execution of the data integration serverless task, a partitioning serverless task; responsive to initiation from the data integration serverless task, establish, at a partitioning tier of the multiple tiers, the partitioning serverless task; identify, via execution of the partitioning serverless task, a partitioning criterion and a concurrency criterion based on a serverless task execution limit and a size of the grouped pre-processed data; partition, via execution of the partitioning serverless task, the grouped pre-processed data in accord with the partitioning criterion to generate a first data chunk and a second data chunk; generate, via execution of the partitioning serverless task, a partitioning inter-tier communication link; via the partitioning inter-tier communication link: initiate, via execution of the partitioning serverless task, a first multi-node analytic serverless task; responsive to initiation from the partitioning serverless task, establish, at an analytic tier of the multiple tiers, the first multi-node analytic serverless task; analyze, via execution of the first multi-node analytic serverless task, the first data chunk and at least a first portion the patterns present within the grouped detail data to generate the first prescriptive output; initiate a second multi-node analytic serverless task, the period based on the concurrency criterion; responsive to initiation from the first multi-node analytic serverless task, establish, at the analytic tier, the second multi-node analytic serverless task; and analyze, via execution of the second multi-node analytic serverless task, the second data chunk and at least a second portion the patterns present within the grouped detail data to generate the second prescriptive output.

C2 The product of example C1, where the instructions are further configured to cause the machine to determine, via execution of the partitioning serverless task, the partitioning criterion and the concurrency criterion further based on a target processing completion schedule for the analytics tier.

C3 The product of example C2, where the instructions are further configured to cause the machine to determine, via execution of the partitioning serverless task, the partitioning criterion and the concurrency criterion further based on the target processing completion schedule for the analytics tier by determining a number of multi-node analytic serverless tasks with a capacity to finish processing the grouped pre-processed data prior to a completion target date.

D1 A method implemented by operation of a system of any of examples A1-A14.

E1 A product comprising instructions stored on a machine readable medium, the instructions configured to cause a machine to implement the method of example D1.

Various implementations have been specifically described. However, many other implementations are also possible.

What is claimed is:
1. A system including:
network interface circuitry configured to:
    receive ingestion detail data from multiple data sources; and
    sending first and second prescriptive outputs to a storage host server; and
tiered analytic processing circuitry configured to execute multiple tiers of serverless tasks, the multiple tiers including:
    a data ingestion tier;
    a data integration and consolidation tier;
    a partitioning tier; and
    an analytic tier;
the tiered analytic processing circuitry configured to:
    establish, at the data ingestion tier, a data ingestion serverless task configured to:
        access, via the network interface circuitry, the ingestion detail data; and
        generate an ingestion inter-tier communication link; and
        via the ingestion inter-tier communication link:
            initiate a data integration serverless task;
    responsive to initiation from the data ingestion serverless task, establish, at the data integration and consolidation tier, the data integration serverless task, the data integration serverless task configured to:
        sort the ingestion detail data into an association grouping to generate grouped detail data;
        parse the grouped detail data to identify patterns present within the grouped detail data to generate grouped pre-processed data;

generate a data integration inter-tier communication link; and
via the data integration inter-tier communication link:
initiate a partitioning serverless task;
responsive to initiation from the data integration serverless task, establish, at the partitioning tier, the partitioning serverless task, the partitioning serverless task configured to:
identify a partitioning criterion and a concurrency criterion based on a serverless task execution limit and a size of the grouped pre-processed data;
partition the grouped pre-processed data in accord with the partitioning criterion to generate a first data chunk and a second data chunk;
generate a partitioning inter-tier communication link; and
via the partitioning inter-tier communication link:
initiate a first multi-node analytic serverless task;
responsive to initiation from the partitioning serverless task, establish, at the analytic tier, the first multi-node analytic serverless task configured to:
analyze the first data chunk and at least a first portion the patterns present within the grouped detail data to generate the first prescriptive output; and
initiate a second multi-node analytic serverless task, the period based on the concurrency criterion; and
responsive to initiation from the first multi-node analytic serverless task, establish, at the analytic tier, the second multi-node analytic serverless task, the second multi-node analytic serverless task configured to analyze the second data chunk and at least a second portion the patterns present within the grouped detail data to generate the second prescriptive output.

2. The system of claim 1, where:
the multiple tiers further include a data merge tier; and
the tiered analytic processing circuitry is further configured to:
establish, in accord with the concurrency criterion, a final multi-node analytic serverless task configured to:
generate an analytic inter-tier communication link; and
via the analytic inter-tier communication link, initiate a data merge serverless task; and
responsive to initiation from the final multi-node analytic serverless task, establish, at the data merge tier, a data merge serverless task configured to merge the first and second prescriptive outputs.

3. The system of claim 2, where the second multi-node analytic serverless task is the final multi-node analytic serverless task.

4. The system of claim 1, where the data integration serverless task is configured to sort the ingestion detail data into multiple association groupings based on multiple pre-determined associations.

5. The system of claim 4, where the storage host server is configured to control multiple databases each defined for a respective one of the multiple association groupings.

6. The system of claim 4, where the multiple association groupings include one or more from among: a client association, a sensor type association, a geographic association, a tagging association, and a utility association.

7. The system of claim 1, where the data integration serverless task is further configured to: prior to sorting the ingestion detail data, exclude ingestion detail data outside of a defined analysis window.

8. The system of claim 1, where the serverless task execution limit includes a pre-defined serverless task timeout.

9. The system of claim 1, where the size of the grouped pre-processed data includes a number of entries within the grouped pre-processed data.

10. The system of claim 1, where one or more from among: the data ingestion serverless task, the data integration serverless task, and the partitioning serverless task include a series of serverless tasks.

11. The system of claim 10, where each serverless task within the series is partially concurrent with another one of the serverless tasks in the series.

12. The system of claim 1, where the partitioning serverless task is configured to determine the partitioning criterion and the concurrency criterion further based on a target processing completion schedule for the analytics tier.

13. The system of claim 12, where the partitioning serverless task is configured to determine the partitioning criterion and the concurrency criterion further based on the target processing completion schedule for the analytics tier by determining a number of multi-node analytic serverless tasks with a capacity to finish processing the grouped pre-processed data prior to a completion target time.

14. The system of claim 1, where the data ingestion serverless task is configured to pass the ingestion detail data to the data integration serverless task by providing the data integration serverless task with a storage location for the ingestion detail data.

15. A method including:
at network interface circuitry:
receiving ingestion detail data from multiple data; and
sending first and second prescriptive outputs to a storage host server; and
at tiered analytic processing circuitry configured to execute multiple tiers of serverless tasks:
establishing, at a data ingestion tier of the multiple tiers, a data ingestion serverless task configured to:
accessing, via execution of the data ingestion serverless task, the ingestion detail data;
generating, via execution of the data ingestion serverless task, an ingestion inter-tier communication link;
via the ingestion inter-tier communication link:
initiating, via execution of the data ingestion serverless task, a data integration serverless task;
responsive to initiation from the data ingestion serverless task, establishing, at a data integration and consolidation tier of the multiple tiers, the data integration serverless task;
sorting, via execution of the data integration serverless task, the ingestion detail data into an association grouping to generate grouped detail data;
parsing, via execution of the data integration serverless task, the grouped detail data to identify patterns present within the grouped detail data to generate grouped pre-processed data;
generating, via execution of the data integration serverless task, a data integration inter-tier communication link;
via the data integration inter-tier communication link:
initiating, via execution of the data integration serverless task, a partitioning serverless task; and
responsive to initiation from the data integration serverless task, establishing, at a partitioning tier of the multiple tiers, the partitioning serverless task;
identifying, via execution of the partitioning serverless task, a partitioning criterion and a concurrency criterion based on a serverless task execution limit and a size of the grouped pre-processed data;
partitioning, via execution of the partitioning serverless task, the grouped pre-processed data in accord with the partitioning criterion to generate a first data chunk and a second data chunk;
generating, via execution of the partitioning serverless task, a partitioning inter-tier communication link;
via the partitioning inter-tier communication link:
initiating, via execution of the partitioning serverless task, a first multi-node analytic serverless task; and
responsive to initiation from the partitioning serverless task, establishing, at an analytic tier of the multiple tiers, the first multi-node analytic serverless task;
analyzing, via execution of the first multi-node analytic serverless task, the first data chunk and at least a first portion the patterns present within the grouped detail data to generate the first prescriptive output;
initiating a second multi-node analytic serverless task, the period based on the concurrency criterion;
responsive to initiation from the first multi-node analytic serverless task, establishing, at the analytic tier, the second multi-node analytic serverless task; and
analyzing, via execution of the second multi-node analytic serverless task, the second data chunk and at least a second portion the patterns present within the grouped detail data to generate the second prescriptive output.

16. The method of claim 15, further including
at the tiered analytic processing circuitry:
establishing, in accord with the concurrency criterion, a final multi-node analytic serverless task;
generating, via execution of the final multi-node analytic serverless task, an analytic inter-tier communication link;
via the analytic inter-tier communication link and via execution of the final multi-node analytic serverless task, initiating a data merge serverless task;
responsive to initiation from the final multi-node analytic serverless task, establishing, at a data merge tier of the multiple tiers, a data merge serverless task; and
merging, via execution of the data merge serverless task, the first and second prescriptive outputs.

17. The method of claim 15, where one or more from among: the data ingestion serverless task, the data integration serverless task, and the partitioning serverless task include a series of serverless tasks.

18. A product including:
machine-readable media other than a transitory signal; and
instructions stored on the machine-readable media, the instructions configured to, when executed, cause a machine to:
at network interface circuitry:
receive ingestion detail data from multiple data; and
send first and second prescriptive outputs to a storage host server; and
at tiered analytic processing circuitry configured to execute multiple tiers of serverless tasks:
establish, at a data ingestion tier of the multiple tiers, a data ingestion serverless task configured to:
access, via execution of the data ingestion serverless task, the ingestion detail data;
generate, via execution of the data ingestion serverless task, an ingestion inter-tier communication link;
via the ingestion inter-tier communication link:
initiate, via execution of the data ingestion serverless task, a data integration serverless task;
responsive to initiation from the data ingestion serverless task, establish, at a data integration and consolidation tier of the multiple tiers, the data integration serverless task;
sort, via execution of the data integration serverless task, the ingestion detail data into an association grouping to generate grouped detail data;
parse, via execution of the data integration serverless task, the grouped detail data to identify patterns present within the grouped detail data to generate grouped pre-processed data;
generate, via execution of the data integration serverless task, a data integration inter-tier communication link;
via the data integration inter-tier communication link:
initiate, via execution of the data integration serverless task, a partitioning serverless task;
responsive to initiation from the data integration serverless task, establish, at a partitioning tier of the multiple tiers, the partitioning serverless task;
identify, via execution of the partitioning serverless task, a partitioning criterion and a concurrency criterion based on a serverless task execution limit and a size of the grouped pre-processed data;
partition, via execution of the partitioning serverless task, the grouped pre-processed data in accord with the partitioning criterion to generate a first data chunk and a second data chunk;
generate, via execution of the partitioning serverless task, a partitioning inter-tier communication link;
via the partitioning inter-tier communication link:
initiate, via execution of the partitioning serverless task, a first multi-node analytic serverless task;
responsive to initiation from the partitioning serverless task, establish, at an analytic tier of the multiple tiers, the first multi-node analytic serverless task;
analyze, via execution of the first multi-node analytic serverless task, the first data chunk and at least a first portion the patterns present within the grouped detail data to generate the first prescriptive output;
initiate a second multi-node analytic serverless task, the period based on the concurrency criterion;
responsive to initiation from the first multi-node analytic serverless task, establish, at the analytic tier, the second multi-node analytic serverless task; and
analyze, via execution of the second multi-node analytic serverless task, the second data chunk and at least a second portion the patterns present within the grouped detail data to generate the second prescriptive output.

19. The product of claim 18, where the instructions are further configured to cause the machine to determine, via execution of the partitioning serverless task, the partitioning criterion and the concurrency criterion further based on a target processing completion schedule for the analytics tier.

20. The product of claim 19, where the instructions are further configured to cause the machine to determine, via execution of the partitioning serverless task, the partitioning criterion and the concurrency criterion further based on the target processing completion schedule for the analytics tier by determining a number of multi-node analytic serverless tasks with a capacity to finish processing the grouped pre-processed data prior to a completion target date.

* * * * *